United States Patent [19]
Andrieu

[11] Patent Number: 4,719,606
[45] Date of Patent: Jan. 12, 1988

[54] PROCESS AND DEVICE FOR PASSIVE DETECTION OF AIRCRAFT, NAMELY HELICOPTERS

[75] Inventor: Michel B. Andrieu, Paris, France

[73] Assignee: Etat Francais, Paris, France

[21] Appl. No.: 741,301

[22] Filed: Mar. 14, 1985

[30] Foreign Application Priority Data

Mar. 22, 1984 [FR] France ................. 84 04424

[51] Int. Cl.⁴ .............................. H04B 1/06
[52] U.S. Cl. .................... 367/135; 367/901; 342/192
[58] Field of Search .............. 73/178 H, 178 T, 185, 73/187; 181/122; 340/566, 945, 946, 952; 343/5 SA, 5 HE, 5 PD; 367/43, 47, 49, 93, 136, 135, 140, 178, 197, 199, 901, 905, 906; 244/17.11, 17.13; 342/192

[56] References Cited

U.S. PATENT DOCUMENTS

| | | | |
|---|---|---|---|
| 3,605,029 | 9/1971 | Freedman | 367/901 |
| 3,691,549 | 9/1972 | Wilson | 340/566 |
| 3,714,620 | 1/1973 | Biren et al. | 367/901 |
| 3,824,532 | 7/1974 | Vandierendonck | 340/566 X |
| 3,939,465 | 2/1976 | Helton et al. | 367/901 X |
| 4,038,656 | 7/1977 | Webb, Jr. et al. | 343/5 SA |
| 4,158,832 | 6/1979 | Barnes, Jr. et al. | 340/566 X |
| 4,310,904 | 1/1982 | Ballard et al. | 367/901 |
| 4,337,528 | 6/1982 | Cinad et al. | 340/566 |
| 4,360,795 | 11/1982 | Hoff | 340/566 |
| 4,594,695 | 6/1986 | Garconnat et al. | 367/901 |

*Primary Examiner*—Deborah L. Kyle
*Assistant Examiner*—Brian S. Steinberger
*Attorney, Agent, or Firm*—Parkhurst & Oliff

[57] ABSTRACT

A process and device for passive detection of helicopters includes detection of helicopter noise and ambient noise by means of an electro-acoustic transducer, and outputting of an amplitude modulated signal therefrom; amplitude demodulation of the signal in the frequency band between 300 Hz and 3500 Hz; spectral analysis of the demodulated signal; and selection and registration of characteristic frequency lines reflective of the rotary units of the helicopter. The process and device permit passive detection of helicopters in the lower noise, higher frequency band, thereby also permitting utilization of smaller antenna arrays.

7 Claims, 3 Drawing Figures

PROCESS AND DEVICE FOR PASSIVE DETECTION OF AIRCRAFT, NAMELY HELICOPTERS

BACKGROUND OF THE INVENTION

This invention relates to a process and a device intended for the passive acoustic detection of aircraft, namely helicopters.

The detection of helicopters is made difficult by their low-altitude flight and it is very dependent on topographic conditions. Passive acoustic detection could usefully supplement radar detection.

Prior art teaches a device which uses the infrasonic energy contained in the acoustic spectrum produced by helicopters. The processing utilized consists in extracting, in the basic band, the infrasonic lines generated by the periodic rotary motion of the main rotor blades.

The advantage of this technique lies in the large wave-lengths associated with the infrasonic band. Thus, aircraft detection behind mountains is possible where as, under identical topographic conditions, the radar usually remains blind.

But the main part of the acoustic energy produced by natural ambient noises and wild noises (wheeled or armoured vehicles, wind, etc.) is distributed over a spectral area which is rarely greater than a few hundred Hertz. This results in masking the infrasonic components while appreciably reducing the signal/noise ratio in the operating area.

It is nearly impossible to make up for this reduction through the use of a directional antenna. As a matter of fact, directivity at infrasonic frequencies can be obtained only by means of networks the dimensions of which would not be compatible with the requirement for small-size equipment capable of being transported on board a vehicle.

SUMMARY OF THE INVENTION

This invention removes these difficulties by proposing a process and a device intended for the passive acoustic detection of helicopters which both utilizes sufficiently small-size components, in particular to permit transport on board a vehicle, and is not very sensitive to ambient and wild noises produced, for example, by vehicles located in the detection area.

These purposes are reached owing to the invention which thus relates to a process for passive acoustic detection of aircraft and more particularly helicopters, and is characterized by the fact that, successively:

the noise of the aircraft and its environment is detected throught an electro-acoustic transducer which generates an amplitude-modulated signal, this signal is amplitude-demodulated in the frequency band ranging from about 300 Hz to about 3,500 Hz, a spectral analysis of the modulated signal is carried out, and the characteristic frequency lines corresponding to periodic components of modulations related mainly to the aircraft rotary units are registered and selected.

The invention also relates to a device for implementing the above process, characterized by the fact that it includes, successively associated:

at least one electro-acoustic transducer, which collects the amplitude-modulated signal, means for demodulating this signal in the 300-3,500 Hz frequency band approximately, and means permitting performance of a spectral analysis of the demodulated signal.

Quite surprisingly, this invention takes advantage of the amplitude modulation exerted by some rotary elements of an aircraft, namely the rotation of the rotor blades of a helicopter on the "wide-band" noise otherwise produced in high frequency. The so-modulated spectral area ranges from about 300 Hz to about 3,500 Hz. Thus, in comparison with the previously known technique, it is advantageous to use this high-frequency spectrum produced by helicopters, an area in which antenna directivity is easier to achieve, thus eliminating the difficult problem posed by the lack of isolated periodic components sufficiently significant in the high frequency band of a helicopter acoustic signature.

BRIEF DESCRIPTION OF THE DRAWINGS

The following description of the illustrative but non-limitating embodiments of the invention is given in reference to the drawings in which.

DESCRIPTION OF THE PREFERRED EMBODIMENTS

Figure 1:
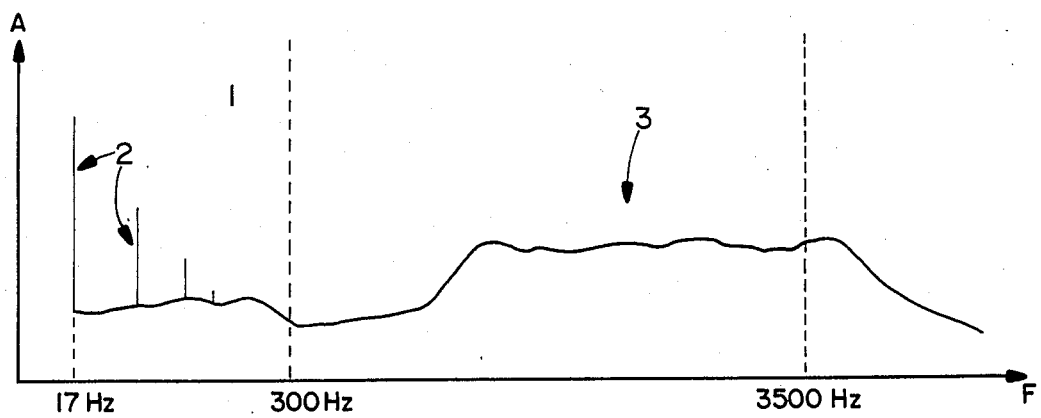
FIG. 1 shows diagrammatically the amplitude of the acoustic signal produced by a helicopter, versus its frequency.

FIG. 1 clearly illustrates the acoustic signal produced by a helicopter, which includes a zone 1 of periodic noises consisting namely of infrasonic lines 2, e.g. at 17 Hz, corresponding to the rotation of the main rotor and their harmonics, and a zone 3 of wide-band noise which can be approximately delimited from 300 to 5000 Hz. The spectral analysis of the infrasonic zone is not usable for the reasons stated above, whereas the spectral analysis of the wide-band zone 3 does not point out the lines which characterize the presence of a helicopter. Therefore, the invention makes it possible, by demodulating the amplitude of the signal represented in FIG. 1 in the band ranging from 300 to 3,500 Hz, approximately to obtain by spectral analysis the signal represented in FIG. 3, which clearly shows for example the 17 Hz periodic component related to the rotation of the main rotor blades.

Figure 2:
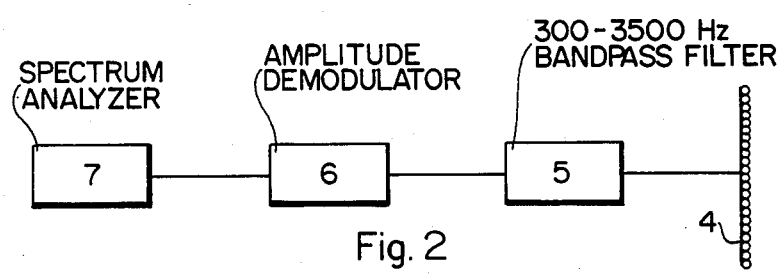
FIG. 2 shows the general diagram of an acoustic detection device according to the invention and, FIG. 3 shows a spectrum of the acoustic signal produced by a helicopter after amplitude demodulation.
Figure 3:
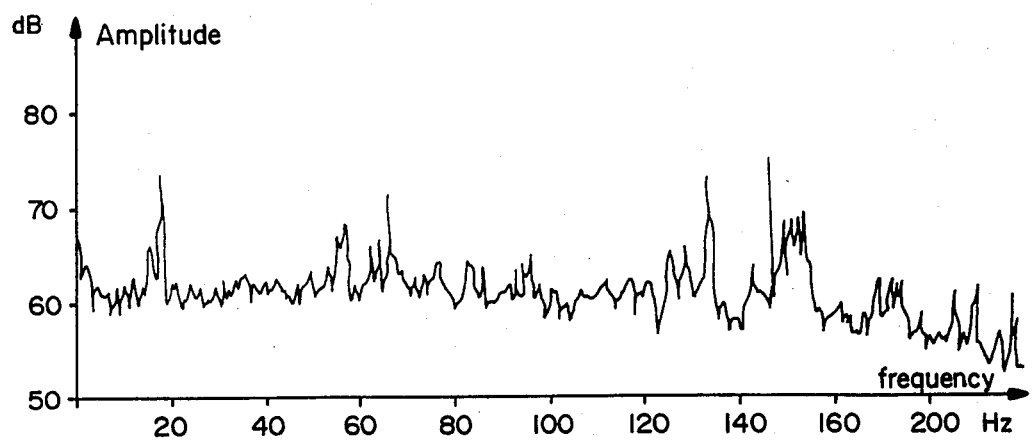

For that purpose, FIG. 2 shows a passive acoustic protection device which includes a directional acoustic antenna (4), consisting for example of several in-line microphones on a support or a flare which thus constitutes an electro-acoustic transducer providing an amplitude modulated signal representing the noises emitted by the helicopter and the ambient noises. The signal produced by the antenna (4) is filtered in a 300-3,500 Hz bandpass filter (5). Then, the filtered signal comes into the amplitude demodulator (6) of a common type. For instance it may consist of a rectifier without threshold associated with a 100 Hz or a few hundred Hz bandpass integrator and it acts as a detector of the demodulated signal envelope. Lastly, the demodulated signal is applied to a spectrum analyzer (7), e.g. a Fourier's transformer of the BRUEL and KJAER 2031 commercial type, which points out the periodic components of the modulations related to the rotor rotation. The spectral analysis can be visualized on a cathode ray tube or graphically as shown in FIG. 3. The bandpass filter frequency operation influences the more or less clear appearance of lines corresponding to periodic components. Of course, the registration of the lines depends on the distance between the helicopter and the detector, which may vary from 2000 to 5000 m. The spectrum corresponding to FIG. 3 was obtained using an omnidirectional transducer. A directional antenna, e.g. of the network type, would point out the characteristic lines more clearly.

The efficiency of the signal processing can be increased by means of preliminary filterings: space filtering owing to a network-type directional antenna and/or electronic filtering which improves the signal/noise ratio.

The applications of the process and of the device according to the invention are, in particular, helicopter detection and the associated warning with sector designation and identification, possibly supplemented with other types of signal processing, e.g. with self-fitting and/or correlation filtering, or integrated into systems associating complementary sub-systems such as radars, optical or infrared devices. Noisy sources with wideband spectrum amplitude modulated by infrasonic components can also be detected.

I claim:

1. A process for passive detection of helicopters, said process comprising the steps of:
   detecting noise of the helicopter and of an ambient environment by means of an electro-acoustic transducer which provides an amplitude modulated signal representative thereof;
   amplitude demodulating said signal in the frequency band ranging from about 300 Hz to about 3,500 Hz;
   performing a spectral analysis of said demodulated signal; and
   selecting and registering characteristic frequency lines corresponding to periodic modulating components reflective of rotary units of the helicopter.

2. The process of claim 1, wherein said amplitude modulated signal is filtered in the frequency band ranging from about 300 Hz to about 3,500 Hz, prior to being amplitude demodulated.

3. A device for passive detection of helicopters, comprising:
   at least one electro-acoustic transducer which detects noise of the helicopter and of an ambient environment and provides an amplitude modulated signal representative thereof;
   means for demodulating said amplitude modulated signal in the frequency band ranging from about 300 Hz to about 3,500 Hz;
   means for performing a spectral analysis of the demodulated signal; and
   means for selecting and registering characteristic frequency lines corresponding to periodic modulation components of rotary units of the helicopter.

4. The device of claim 3, further comprising means for filtering the amplitude modulated signal in the frequency band ranging from about 300 Hz to about 3,500 Hz, said means comprising a 300 Hz–3,500 Hz bandpass filter, and wherein said amplitude demodulating means comprises a rectifier without threshold and a 100 Hz bandpass integrator, and further wherein said means for performing a spectral analysis comprises a spectrum analyzer.

5. The device of claim 4, wherein said at least one electro-acoustic transducer comprises a plurality of electroacoustic transducers provided on a directional antenna of the network type.

6. The device of claim 4, wherein said at least one electro-acoustic transducer is of the directional type in the 300 Hz–3,500 Hz band.

7. The device of claim 4, wherein the spectrum analyzer is of the Fourier's transformer type.

* * * * *